United States Patent [19]

Wolf et al.

[11] Patent Number: 4,853,119
[45] Date of Patent: Aug. 1, 1989

[54] MICROWAVE EMULSION TREATER WITH INTERNAL COALESCER

[75] Inventors: Nicholas O. Wolf; Roger L. Hudgins; David S. Seidner, all of Ponca City, Okla.

[73] Assignee: Conoco Inc., Ponca City, Okla.

[21] Appl. No.: 172,688

[22] Filed: Mar. 24, 1988

[51] Int. Cl.⁴ .............................................. B01D 17/04
[52] U.S. Cl. ..................................... 210/181; 210/182; 210/748; 210/DIG. 5
[58] Field of Search ............... 210/708, 748, 799, 182, 210/186, 181, DIG. 5; 252/331, 346, 348, 358

[56] References Cited

U.S. PATENT DOCUMENTS

| | | | |
|---|---|---|---|
| 2,257,997 | 10/1941 | Barnes | 252/349 |
| 2,494,392 | 1/1950 | Kirkbride et al. | 252/324 |
| 2,747,684 | 5/1956 | Lewis et al. | 210/DIG. 5 |
| 3,104,711 | 9/1963 | Haagensen | 166/60 |
| 3,133,592 | 5/1964 | Tomberlin | 166/60 |
| 3,170,519 | 2/1965 | Haagensen | 166/60 |
| 3,200,567 | 8/1965 | May | 55/175 |
| 3,523,076 | 8/1970 | Goerz, Jr. et al. | 210/748 |
| 3,594,314 | 7/1971 | Bilhartz et al. | 210/748 |
| 3,810,832 | 5/1974 | Rhodes | 210/DIG. 5 |
| 4,082,669 | 4/1978 | Bainbridge | 210/187 |
| 4,180,718 | 12/1979 | Hanson | 34/164 |
| 4,257,895 | 3/1981 | Murdock | 210/243 |
| 4,582,629 | 4/1986 | Wolf | 252/348 |

FOREIGN PATENT DOCUMENTS

| | | | |
|---|---|---|---|
| 58-95503 | 6/1983 | Japan | 210/748 |
| 58-95519 | 6/1983 | Japan | 210/748 |

*Primary Examiner*—Peter Hruskoci

[57] ABSTRACT

A microwave-based emulsion treating system comprising a microwave energy source and a microwave applicator for treating an oil-water emulsion is disclosed. The applicator includes an internal coalescer medium for enhancing the effects of the microwave energy in separating the emulsion.

4 Claims, 2 Drawing Sheets

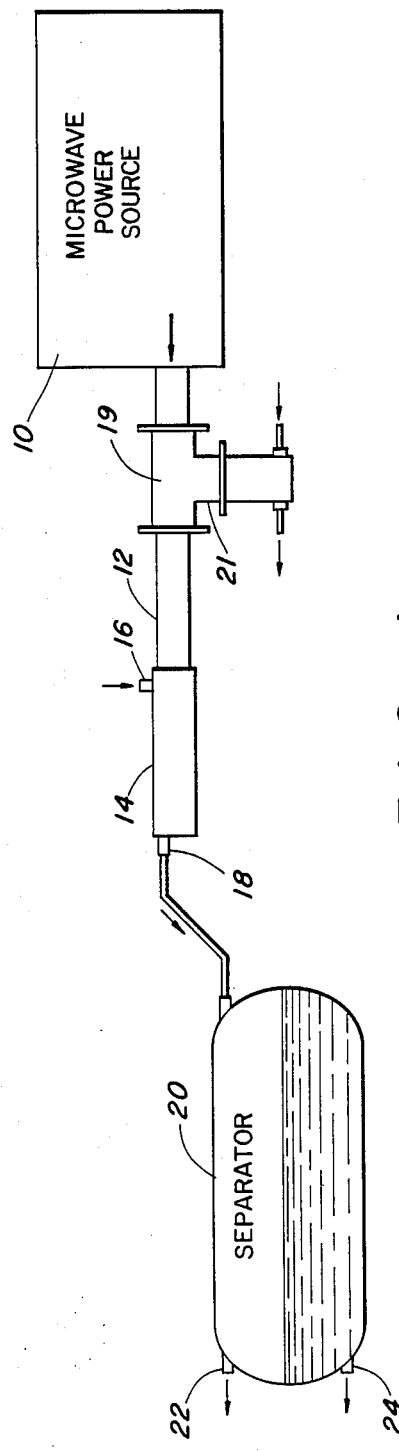
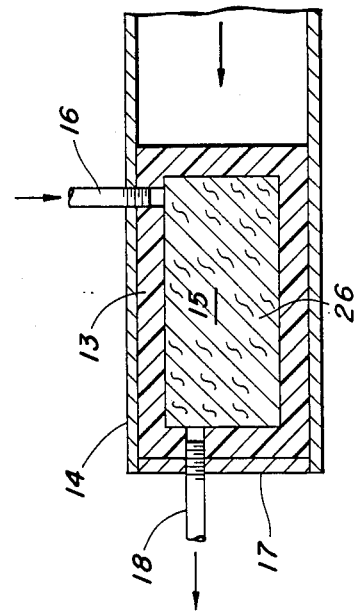
FIG. 1
FIG. 2

MICROWAVE EMULSION TREATER WITH INTERNAL COALESCER

BACKGROUND OF THE INVENTION

1. Field of the Invention

The present invention relates to a method for enhancing the separation of oil and water dispersions and emulsions. More particularly, the present invention is concerned with enhancing separation of oil and water emulsions and dispersions by treating the same with microwave radiation, whether alone or in conjunction with more conventional separating devices.

In the petroleum industry, most of the crude oil produced is co-mingled with water and gas. It is therefore necessary to provide a means of sufficiently and economically separating the oil, gas and water for separate discharge. Usually the separated water is returned to a subterranean formation containing oil and the separated oil is conducted to a pipeline for ultimate transportation to a refinery and end use. Normally, the separated gas is vented if in small quantities or if in commercial quantities collected for distribution and sale.

Primary production of oil from subterranean oil-bearing reservoirs is normally obtained by exploiting the natural drive energy of the reservoir in the form of water drive, gas cap drive, solution gas drive, and combinations thereof. Oil remaining in the reservoir after primary energy sources have been depleted can be partially recovered by secondary recovery methods. One of the most common secondary recovery methods is waterflooding. Using this method, flooding water is injected into the reservoir through one or more injection wells penetrating the oil-bearing reservoir. The water displaces the oil in the reservoir and moves it through the reservoir toward one or more production wells from which oil is produced. Produced oil, whether from natural drive, secondary recovery or enhanced oil recovery operations, often contains water which must be separated from the produced oil.

With the rising value of petroleum products, it becomes increasingly important that separator equipment utilized by the petroleum industry extract the maximum possible recovered petroleum products from oil and water emulsions and dispersions. To this end, improved separating vessels have been developed over the years. Initially, the separators were merely open vessels providing a quiet zone with the intention that the water settle out and be withdrawn from the bottom of the vessel and that the petroleum float on the water and be withdrawn from the top of the vessel. While this system is satisfactory to a degree, it nevertheless results in some oil remaining in the form of an emulsion or dispersion with the withdrawn water, and in like manner in water being entrapped with the oil withdrawn from the top of the vessel. Further, such gravitational settling procedures are slow and require vessels of such volume that to allow separation by gravitation alone becomes excessively expensive, and the slow separation rate results in general overall inefficiency.

2. The Prior Art

Representative but non-exhaustive examples of various types of apparatus previously used in the art of separating co-produced oil and water are gun barrel treaters, heater treaters, and the like. An apparatus specifically designed for use in separating oil and water can be found in, for example, U.S. Pat. No. 4,257,895. The use of ultrasonics is known for breaking oil-water emulsions as described in U.S. Pat. Nos. 2,257,997; 3,200,567; and 3,594,314. Other references disclose the application of microwave energy in the recovery of oil from oil wells and oil shale, including U.S. Pat. Nos. 3,104,711, 3,133,592; 3,170,519 and 4,180,718. Microwave energy has also been used in settling of solids and sewage and sewage sludge, such as described in U.S. Pat. No. 3,523,076. The use of a fibrous coalescer to aid in separation of an emulsion is described in U.S. Pat. No. 2,494,392.

More recently, a method for enhancing the separation of oil and water from an emulsion or dispersion was described in U.S. Pat. No. 4,582,629. The method described in that patent has been effective up to a point, but has been limited in application because of certain energy inefficiencies. The present invention provides a system for improving the efficiency of microwave-based oil-water separators.

It is accordingly an object of this invention to provide a microwave based oil-water separation system having a higher efficiency than previously available systems.

DESCRIPTION OF THE DRAWINGS

FIG. 1 is a schematic view of a microwave-based oil-water separator system.

FIG. 2 is an elevational view, partially cut away, showing details of a microwave applicator having an internal coalescer.

DESCRIPTION OF THE PREFERRED EMBODIMENT

Figure 3:
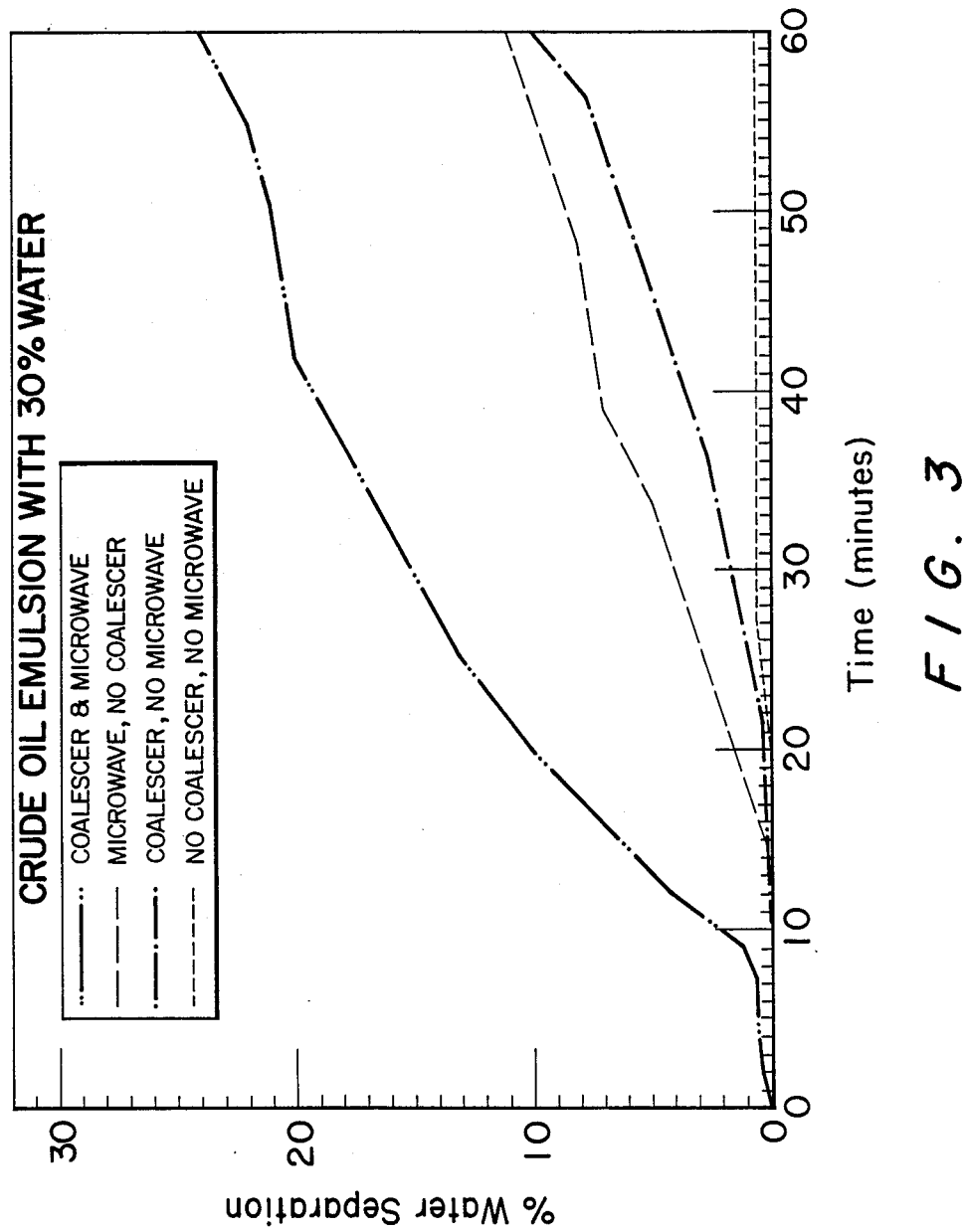
FIG. 3 is a graph showing the improved results provided by the invention.

Referring to the drawings, a microwave power source 10 is provided with a wave guide 12 extending to an applicator 14. Applicator 14 is provided with inlet 16 and outlet 18 for passage of an oil-water emulsion or dispersion. Outlet 18 extends to an oil-water separator tank 20 where the microwave treated stream separates into an upper oil phase and a lower water phase. Outlets 22 and 24 are provided from the upper and lower portions, respectively, of separator 20 for recovery of the separated phases.

As best seen in FIG. 2, a chamber 15 in a block 13 of, for example, Teflon polymer inside applicator 14 is filled with coalescer medium 26 such that the emulsion or dispersion being subjected to microwave energy in applicator 14 will simultaneously contact the coalescer medium 26. Inlet 16 and outlet 18 extend to and from chamber 15, and an end plate 17 of aluminum or other suitable material is provided to reflect energy back through the emulsion or dispersion. It will normally be desirable to include a circulator device 19 in the wave guide 12 to protect the microwave generator. Such a circulator device typically includes a pair of fixed permanent magnets (not shown) for directing reflected energy traveling back through wave guide 12 and directing the reflected energy through leg 21 in circulator 19 and into an energy absorbing water load in leg 21. The use of circulators for this purpose is well understood by those skilled in the art.

Coalescer medium 26 may be of any suitable high surface area configuration, such as wood mesh excelsior or corrugated polypropylene. One particularly preferred material is a corrugated polypropylene available from C. E. Natco and designated Performax. Other high surface area materials may be used, provided they have a low dielectric constant and a low loss factor. Preferred materials are those having a dielectric constant at 2450 MHz of from about 0.1 to about 15, most preferably from 2 to 3, and a loss factor of from near zero to about 2, most preferably less than 0.05.

The combination of a microwave based emulsion breaker and a coalescer medium in the microwave applicator provides a synergistic result as illustrated in FIG. 3. The results depicted in the graph were obtained by measuring water separation over a period of time from an emulsion of water and crude oil. As seen in the graph, the amount of water recovered when the system of this invention was utilized is much more than the additive amount of water separated by use of microwave and coalescer separately over a comparable time period.

The system as described above could be used in conjunction with other conventional separator devices (not shown) either upstream or downstream from the microwave-based system.

Operation of the System

The operation of the system as illustrated in the drawing is straightforward. Oil-water emulsion or dispersion is conveyed via inlet 16 to applicator 14 where it is heated by microwave energy from power source 10 through wave guide 12 while simultaneously being contacted by coalescer medium 26 while the emulsion or dispersion contains the most heat energy. The heated stream exits applicator 14 through outlet 18 to separator 20, where the stream separates into an upper oil phase and a lower water phase. The separated phases are recovered through outlets 22 and 24 on separator 20.

Any level of control can readily be applied to the system to control throughput, amount of energy applied, interface level, etc., to obtain a desired separation.

We claim:

1. In a microwave-based emulsion treating system comprising a microwave energy source and a microwave energy applicator having an inlet for an oil and water emulsion to be treated with microwave energy and an outlet for discharge of treated oil and water, the improvement comprising a coalescer medium having a dielectric constant at 2450 MHz of from about 0.1 to about 15 and a loss factor of less than 2 positioned inside said applicator for contacting said emulsion simultaneously with treatment of said emulsion by microwave energy wherein said emulsion contacts said coalescer medium while said emulsion contains the most heat energy from said microwave source to enhance separation of said water from said emulsion.

2. The system as defined in claim 1 wherein said coalescer medium is excelsior.

3. The system as defined in claim 1 wherein said coalescer medium is corrugated polypropylene.

4. The system as defined in claim 1 wherein said coalescer medium has a dielectric constant at 2450 MHz of from 2 to 3 and a loss factor of less than 0.05.

* * * * *